United States Patent
Vigil et al.

(10) Patent No.: US 9,738,324 B1
(45) Date of Patent: Aug. 22, 2017

(54) VEHICLE SUPPORT STRUCTURE PILLAR AND METHOD OF MANUFACTURING THE SAME

(71) Applicant: Honda Motor Co., Ltd., Tokyo (JP)

(72) Inventors: Fabian J. Vigil, Columbus, OH (US); Kurtis Ray Horner, Marysville, OH (US); Edward Bach, Galloway, OH (US); Hirokazu Matsuura, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/187,681

(22) Filed: Jun. 20, 2016

(51) Int. Cl.
*B62D 25/00* (2006.01)
*B62D 25/04* (2006.01)
*B62D 23/00* (2006.01)
*B21C 23/00* (2006.01)

(52) U.S. Cl.
CPC .............. *B62D 25/04* (2013.01); *B21C 23/00* (2013.01); *B62D 23/00* (2013.01)

(58) Field of Classification Search
CPC .......... B62D 25/04; B62D 23/00; B21C 23/00
USPC ............................................ 296/193.06, 205
See application file for complete search history.

(56) References Cited

U.S. PATENT DOCUMENTS

| 4,986,597 | A | 1/1991 | Clausen |
| 5,398,989 | A | 3/1995 | Winter et al. |
| 5,765,906 | A | 6/1998 | Iwatsuki et al. |
| 6,203,099 | B1 | 3/2001 | Iwatsuki |
| 6,258,465 | B1 | 7/2001 | Oka et al. |
| 6,293,618 | B1 * | 9/2001 | Sukegawa ............... B62D 25/04 296/203.01 |
| 6,854,790 | B2 * | 2/2005 | Yoshida ................. B62D 25/04 296/187.05 |
| 6,896,317 | B2 | 5/2005 | Liebhard et al. |
| 7,562,929 | B2 | 7/2009 | Schiebel et al. |
| 8,162,388 | B2 * | 4/2012 | Balzer .................. B62D 23/005 296/203.03 |
| 8,960,781 | B2 | 2/2015 | Rawlinson et al. |
| 9,090,290 | B2 | 7/2015 | Kellner |
| 2014/0327274 | A1 | 11/2014 | Baldwin |

* cited by examiner

*Primary Examiner* — Joseph D Pape
(74) *Attorney, Agent, or Firm* — Kenealy Vaidya LLP

(57) ABSTRACT

Some embodiments are directed to a support structure for use with a vehicle, the vehicle having a frame to which the support structure is attached. The support structure can include an elongated pillar defining a hollow portion extending therethrough. The elongated pillar can also define at least two rectangular channels approximately rectangular in cross-section extending through the hollow portion along a direction of elongation of the pillar. The elongated pillar can also define one other channel having a non-parallelogram cross-section extending through the hollow portion along a direction of elongation of the pillar.

20 Claims, 15 Drawing Sheets

VEHICLE SUPPORT STRUCTURE PILLAR AND METHOD OF MANUFACTURING THE SAME

BACKGROUND

The disclosed subject matter is directed to a vehicle support structure, and methods of use and manufacture thereof. More particularly, the disclosed subject matter is directed to methods and apparatus for enhancing structural capabilities of vehicle frame components.

Many types of vehicles include frame assemblies, which provide structural support for the vehicle. However, operation of the vehicle may impose stresses on the frame assembly. These stresses can cause detrimental wear effects on the frame assembly, including deformation and breakage. These wear effects can be influenced by a variety of factors, including frame component mass, shape, cross-section, and forming method.

SUMMARY

As one example, increasing the frame mass by adding reinforcements to the support structure may decrease wear effects. However, vehicle performance can be enhanced by decreasing mass of frame components while maintaining or improving structural capabilities. Various vehicular design factors may make it challenging to sufficiently reinforce vehicle frame assemblies with support members without degrading vehicle performance via added mass. For example, support members may include hollow interior portions for reduced mass while providing structural reinforcement to the vehicle frame. These hollow interior portions can be structurally weaker/stronger depending on extrusion function for performance. As a result, the support members can be subject to deformation and breakage as a result of stresses from vehicle operation.

It may therefore be beneficial to provide a vehicle support structure and methods of use and manufacture thereof, that address, that address at least one of the above and/or other challenges of related art vehicles. In particular, it may be beneficial to enhance structural support of a vehicle frame assembly, such as by enhancing structural rigidity of support members extending along portions of the vehicle frame assembly. For example, the vehicle support structure can include crossbeams extending therethrough to create multiple compartments to reinforce exterior walls of the structure. Thus, stresses on the vehicle frame assembly resulting from vehicle operation may be impeded from deforming or breaking the support structure.

In some of these and/or other embodiments, the vehicle support structure can be configured to include a hollow interior portion. In some of these and/or other embodiments, the hollow interior of the support structure can have channels extending therethrough, the channels having approximately rectangular cross-sections. In some of these and/or other embodiments, the hollow interior may also include a channel having a non-parallelogram cross-section extending therethrough.

Some embodiments are therefore directed to a support structure for use with a vehicle, the vehicle having a frame to which the support structure is attached. The support structure can include an elongated pillar defining a hollow portion extending therethrough. The elongated pillar can also define at least two rectangular channels approximately rectangular in cross-section extending through the hollow portion along a direction of elongation of the pillar. The elongated pillar can also define one other channel having a non-parallelogram cross-section extending through the hollow portion along a direction of elongation of the pillar.

Some other embodiments are directed to a frame assembly for use with a vehicle. The frame assembly can include a frame body. The frame assembly can also include a support structure configured for attachment to the frame. The support structure can include an elongated pillar defining a hollow portion extending therethrough. The elongated pillar can also define at least two rectangular channels approximately rectangular in cross-section extending through the hollow portion along a direction of elongation of the pillar. The elongated pillar can further define one other channel having a non-parallelogram cross-section extending through the hollow portion along a direction of elongation of the pillar.

Still other embodiments are directed to a method of manufacturing a support structure for use with a vehicle, the vehicle having a frame to which the support structure is configured to be attached to, the method comprising: extruding an elongated pillar defining a hollow portion extending therethrough; forming at least two rectangular channels approximately rectangular in cross-section extending through the hollow portion along a direction of elongation of the pillar; and forming one other channel having a non-parallelogram cross-section so as to extend through the hollow portion along a direction of elongation of the pillar.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various headings are provided below for convenience and clarity. However, these headings are not intended to limit the scope or content of the disclosure, and/or the scope of protection afforded the various inventive concepts disclosed herein.

I. Overall Vehicle Frame Assembly

Figure 1:
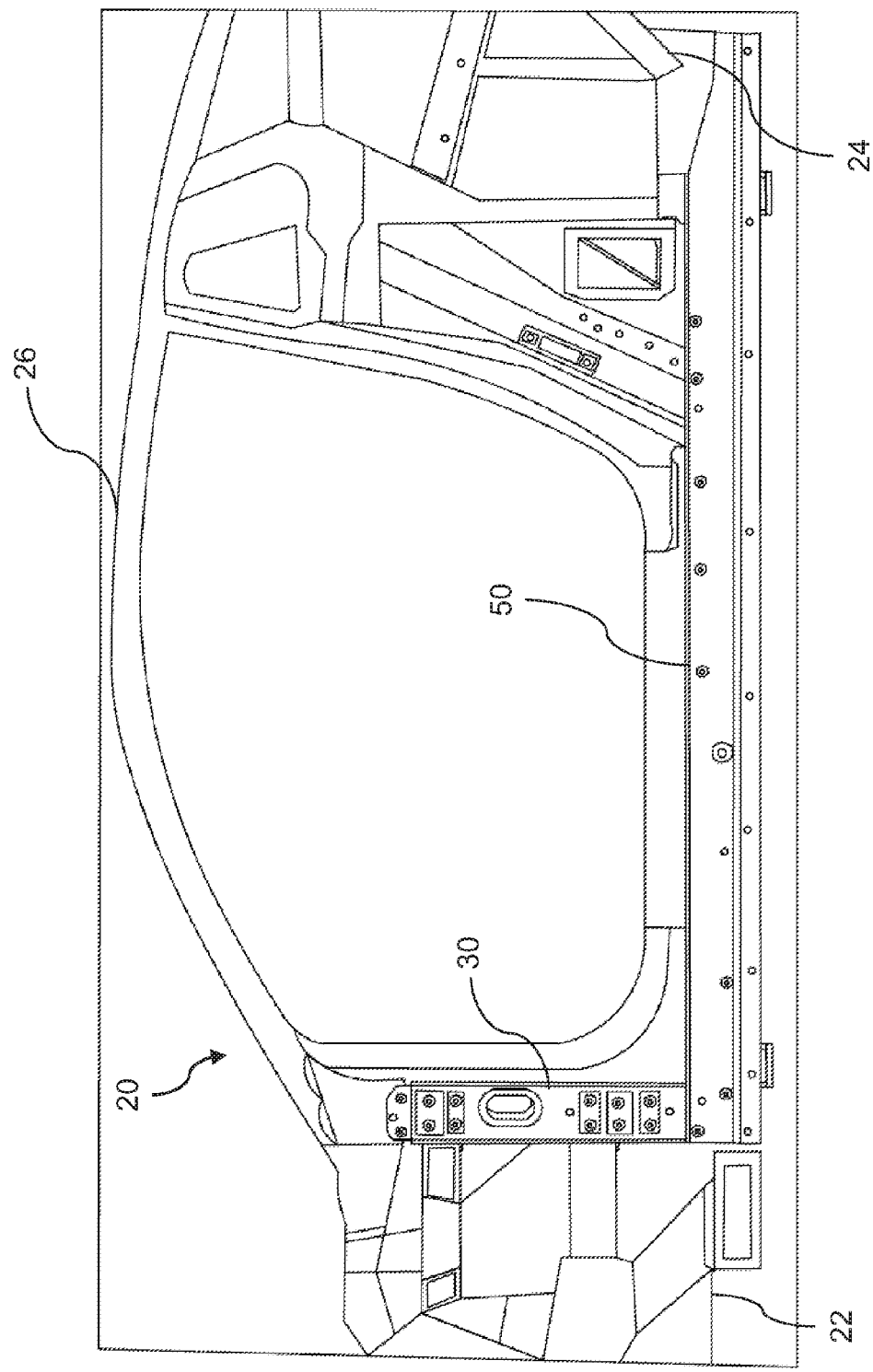
FIG. 1 is a perspective view of a side of an exemplary vehicle frame assembly, the vehicle frame assembly including an exemplary A-pillar in accordance with the disclosed subject matter.

FIGS. 1, 2, 10 and 13 are perspective views of an exemplary vehicle frame assembly 20, the vehicle frame assembly 20 including exemplary A-pillars 30, side sills 50, B-pillars 70, and a rear cabin pillar 90 in accordance with the disclosed subject matter. The vehicle frame assembly 20 shown in FIG. 1 is primarily for use in vehicles configured to travel along paved roadways, such that the exemplary vehicle can be referred to as a passenger vehicle. Specifically, the vehicle frame assembly 20 shown in FIGS. 1-2, 6-7, 10-11, and 13-14 is for use in high-performance vehicles. The vehicle frame assembly 20 may also be for use in vehicles configured to travel along unpaved roadways consisting of gravel, dirt, sand, etc.

However, the disclosed support members of the frame assembly can be used in any vehicle that is configured for travel along any one or combination of improved, unimproved, and unmarked roadways and paths consisting of gravel, dirt, sand, etc. For example, embodiments are intended to include or otherwise cover any type of automobile, including passenger car, high-performance car, minivan, truck, etc. In fact, embodiments are intended to include or otherwise cover configurations of the support members for use with frame assemblies in any other type of vehicle, such as an aircraft, boat, ship, train, spacecraft, etc. Some other embodiments can be used in non-vehicular applications, such as for any other structure in which lightweight reinforced pillars may be desirable.

The vehicle frame assembly 20 can include a front sub-assembly 22, a rear sub-assembly 24, roof rails 26 (the right-side roof rail is obstructed from view), A-pillars 30 (the right-side A-pillar is obstructed from view), side sills 50 (the right-side side pillar is obstructed from view), B-pillars 70 (the right-side B-pillar is obstructed from view), and a rear cabin pillar 90 (the rear cabin pillar is obstructed from view).

II. A-Pillar

Figure 2:
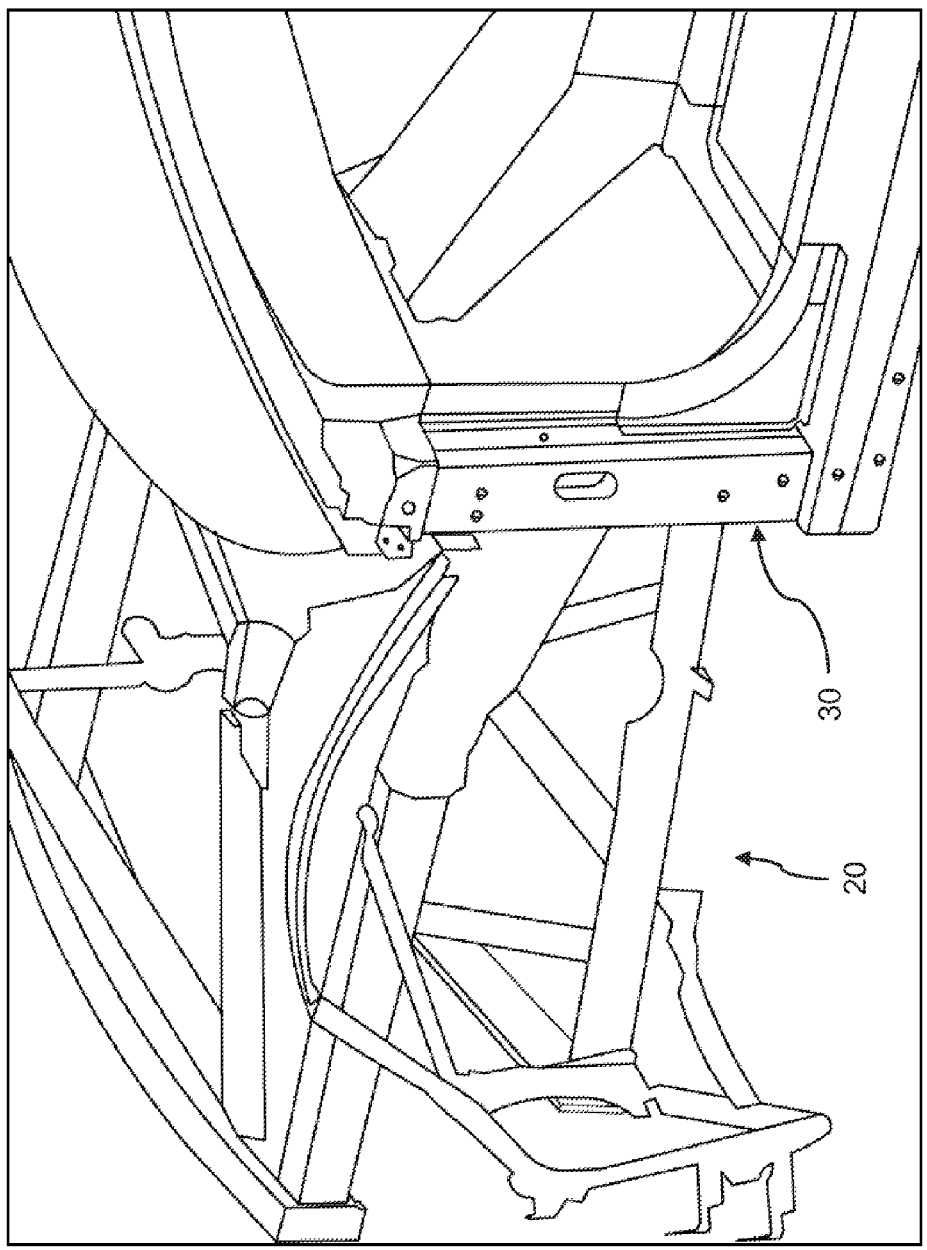
FIG. 2 is a perspective view of part of the vehicle frame assembly of FIG. 1 including the A-pillar.

The present embodiment of the A-pillars 30 shown in FIGS. 1 and 2 can be disposed proximate the front sub-assembly 22 of the vehicle frame assembly 20. Specifically, the A-pillars 30 can be disposed adjacent portions of the respective roof rails 26 configured to surround a windshield. Thus, the A-pillars 30 may be disposed fore of a passenger area of the vehicle frame assembly 20. The A-pillars 30 can extend vertically from a floor to the roof rails 26 of the vehicle frame assembly 20. However, the A-pillars 30 of other embodiments may be oriented at an angle rather than vertical.

Figure 3:
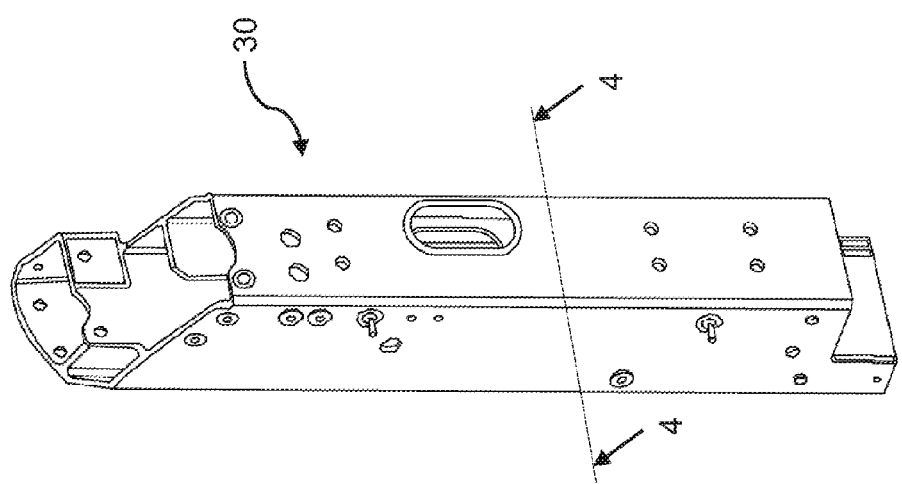
FIG. 3 is a perspective view of the A-pillar.
Figure 4:
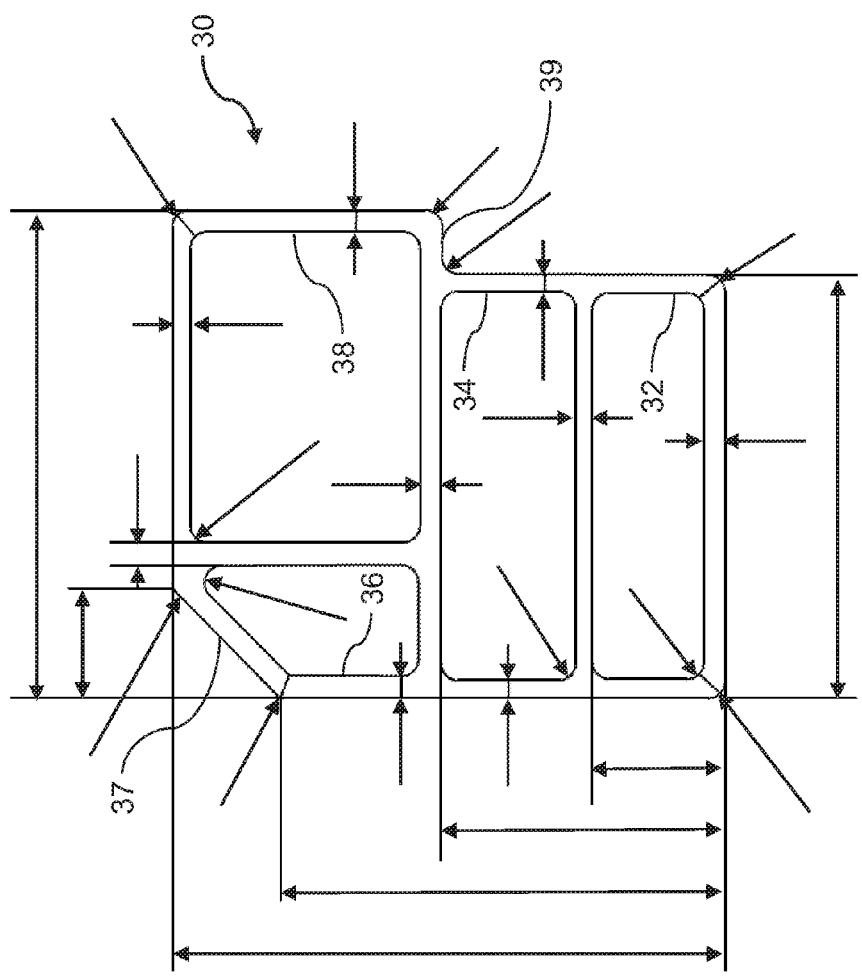
FIG. 4 is a cross-section view of the A-pillar of FIG. 3.
Figure 5:
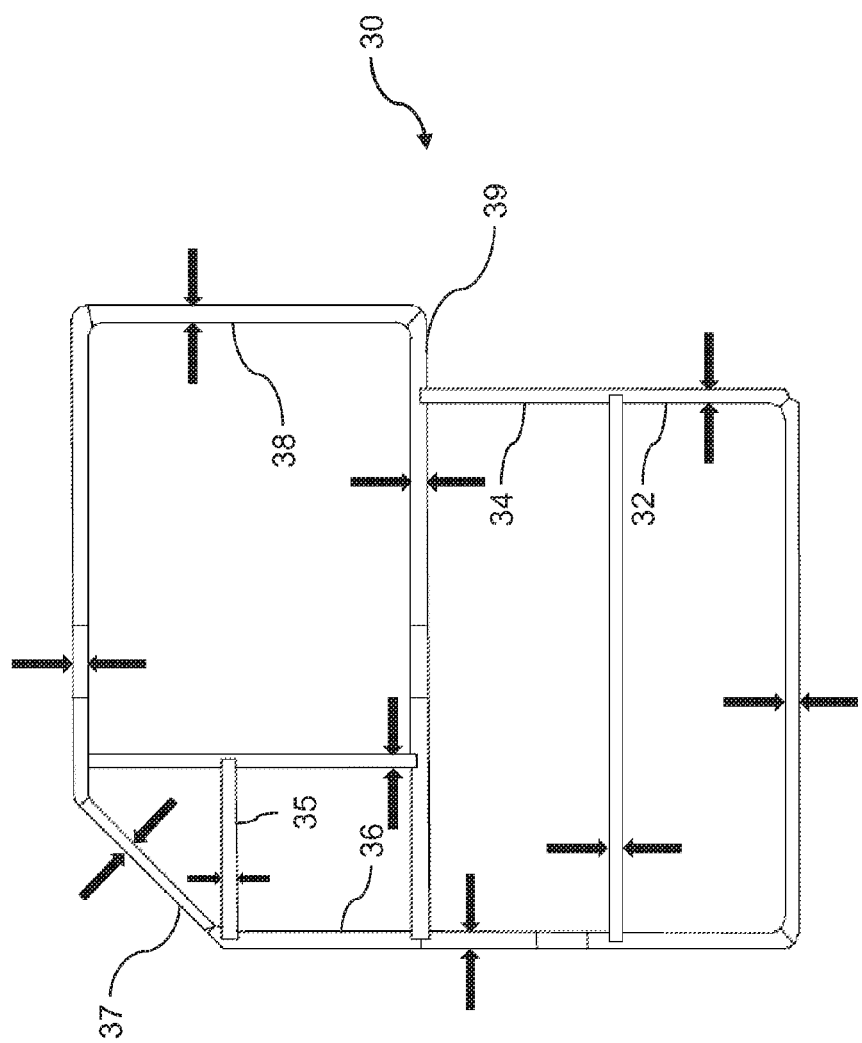
FIG. 5 is a cross-section view of an alternate embodiment of the A-pillar.

The A-pillars 30 of the present embodiment shown in FIGS. 3-5 can be configured as an extruded element having various shaped sub-sections extending therethrough. The sub-sections can be configured as open-ended channels extending between opposing ends of the A-pillars 30, the sub-sections extending parallel to each other. The A-pillars 30 may include various fasteners and apertures configured to facilitate attachment of the A-pillars 30 to the vehicle frame assembly 20.

As shown in detail in the cross-section view of the A-pillar 30 in FIG. 4, the A-pillar 30 can be configured to include the various shaped sub-sections described above. Specifically, the A-pillar 30 of the present embodiment can be extruded to form shapes defining at least two rectangular shaped sub-sections 32,34 and one non-parallelogram shaped sub-section 36. The non-parallelogram shaped sub-section 36 can include an angled side 37. The two rectangular shaped sub-sections 32,34 may have substantially equal dimensions, or alternatively may have varying dimensions. In the present embodiment, the A-pillar 30 can also form a third rectangular shaped sub-section 38. The third rectangular shaped sub-section 38 may include a stepped portion 39. The third rectangular shaped-subsection 38 may have different dimensions than the two rectangular shaped sub-sections 32,34, or may alternatively have substantially equal dimensions. Dimensions of each of the sub-sections and partitions within the A-pillar 30 may vary, including wall thickness of any of the sub-sections or perimeter sides.

The alternate embodiment of the A-pillar 30 shown in FIG. 5 include an additional partition 35 extending through the non-parallelogram shaped sub-section 36. The partition 35 may extend from a perimeter of the A-pillar 30 proximate the non-parallelogram shaped sub-section to the rectangular shaped sub-section.

III. Side Sill

Figure 6:
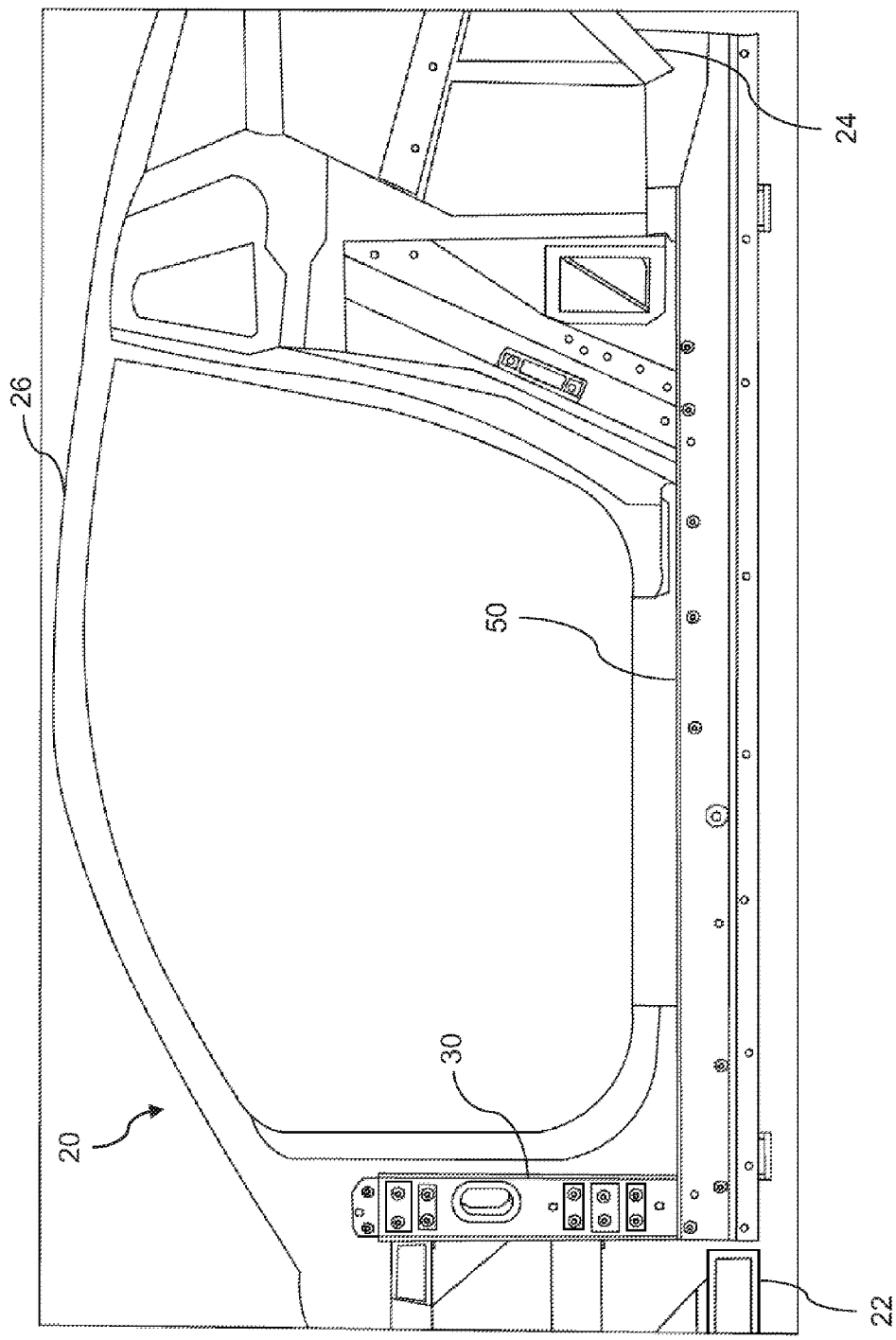
FIG. 6 is a perspective view of the side of the vehicle including an exemplary side sill in accordance with the disclosed subject matter.

The present embodiment of the side sills 50 shown in FIG. 6 can be disposed proximate the floor of the vehicle frame assembly 20 opposite the roof rails 26. Specifically, the side sills 50 can extend from the respective A-pillars 30 to the B-pillars 70 and the rear sub-assembly 24. Thus, the side sills 50 may be disposed along a lower portion of the passenger area of the vehicle frame assembly 20. The side sills 50 can extend horizontally along the floor adjacent lower edges of respective door openings of the vehicle frame assembly 20. However, the side sills 50 of other embodiments may extend at an angle so as not to be horizontal.

Figure 7:
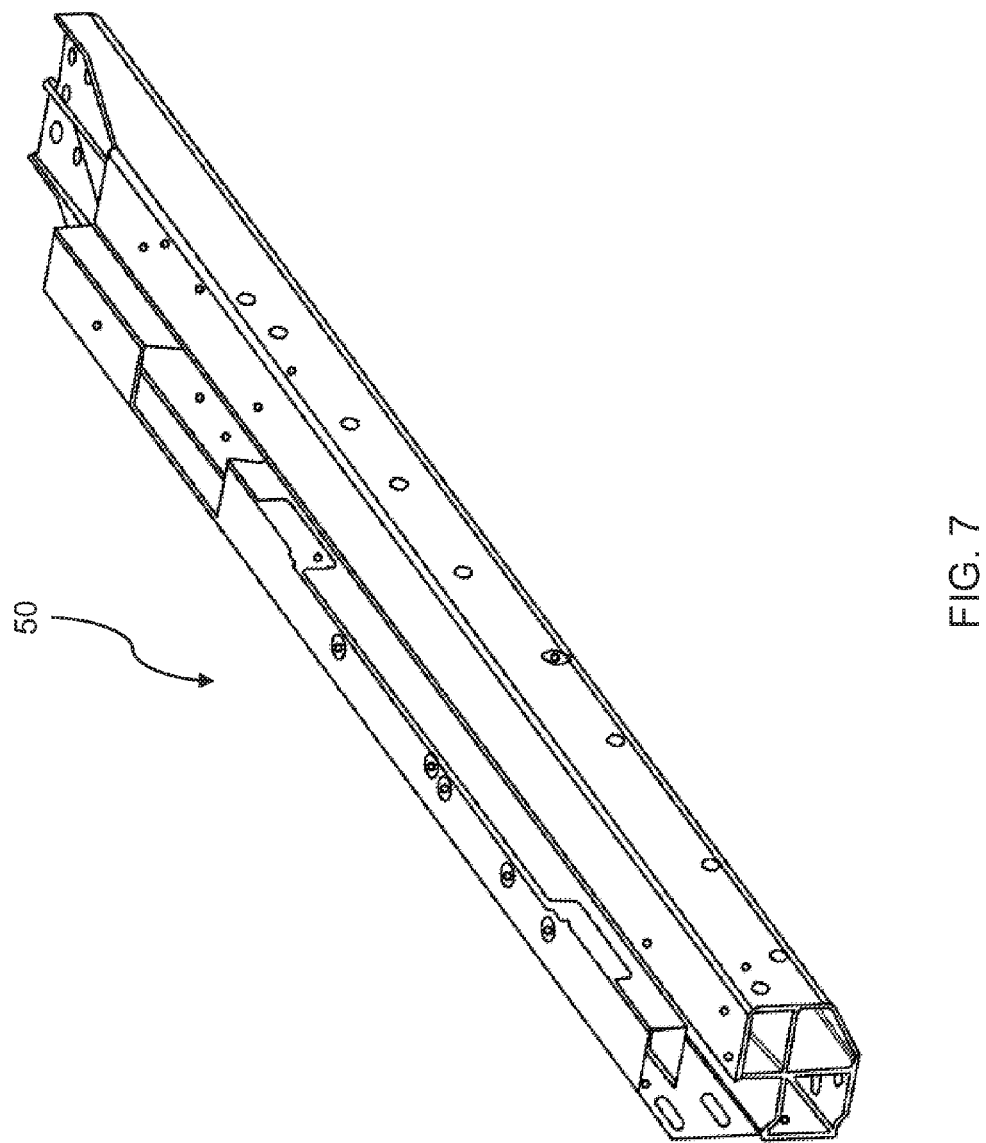
FIG. 7 is a perspective view of the side sill.
Figure 8:
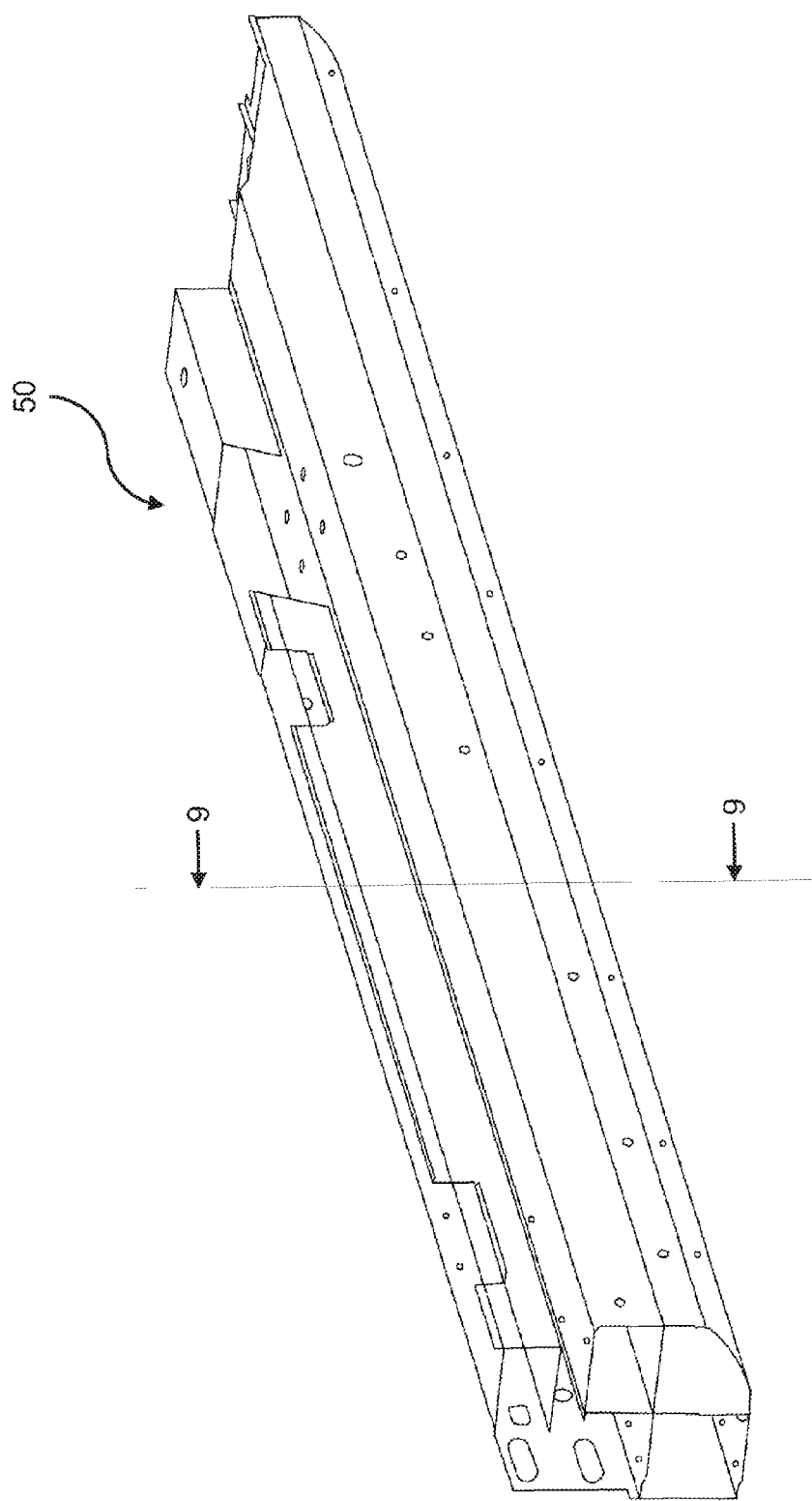
FIG. 8 is a cross-section view of the side sill of FIG. 7.
Figure 9:
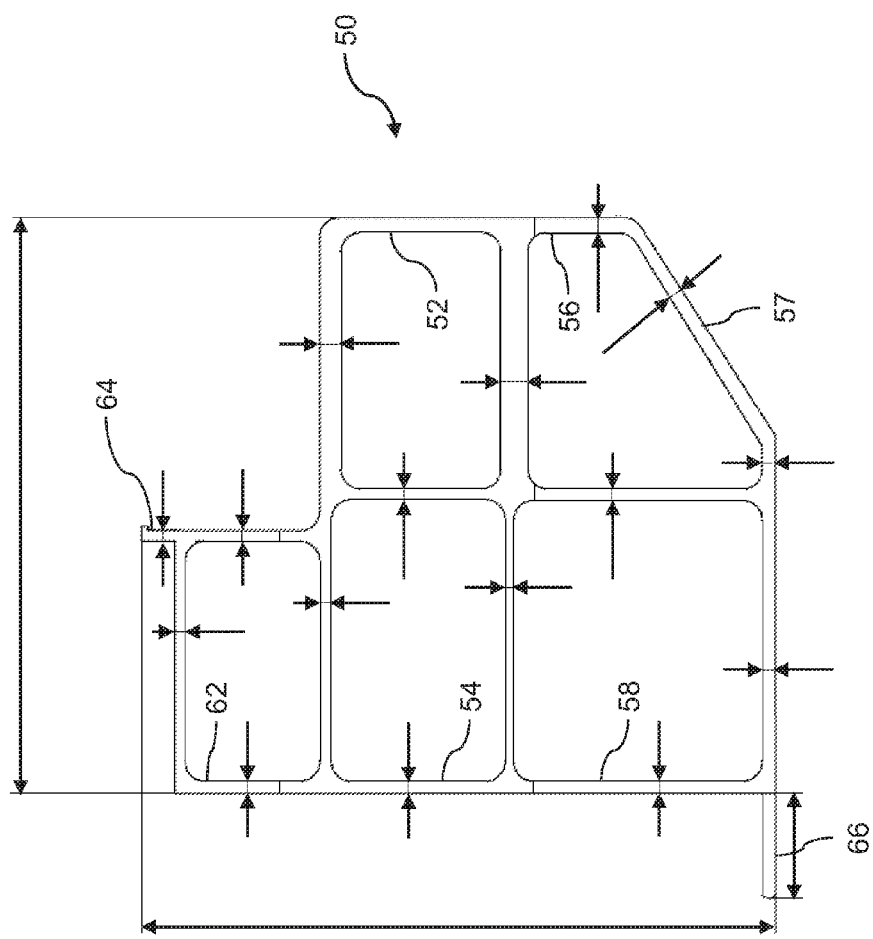
FIG. 9 is a perspective view of the side sill of FIG. 7.

The side sills 50 of the present embodiment shown in FIGS. 7-9 can be configured as an extruded element having various shaped sub-sections extending therethrough. The sub-sections can be configured as open-ended channels extending between opposing ends of the side sills 50, the sub-sections extending parallel to each other. The side sills 50 may include various fasteners and apertures configured to facilitate attachment of the side sills 50 to the vehicle frame assembly 20.

As shown in detail in the cross-section view of the side sill 50 in FIG. 9, the side sill 50 can be configured to include the various shaped sub-sections described above. Specifically, the side sill 50 of the present embodiment can be extruded to form shapes defining at least two rectangular shaped sub-sections 52,54 and one non-parallelogram shaped sub-section 56. The non-parallelogram shaped sub-section 56 can include an angled side 57. The two rectangular shaped sub-sections 52,54 may have substantially equal dimensions, or alternatively may have varying dimensions. In the present embodiment, the side sill 50 can also form a third rectangular shaped sub-section 58. The third rectangular shaped sub-section 58 may include a protruding section 66 extending therefrom. The third rectangular shaped-subsection 58 may have different dimensions than the two rectangular shaped sub-sections 52,54, or may alternatively have substantially equal dimensions. The side sill 50 of the present embodiment may also include a fourth rectangular shaped sub-section 62. The fourth rectangular shaped sub-section 62 may include a protruding section 64 extending therefrom. The fourth rectangular shaped-subsection 62 may have different dimensions than the two rectangular shaped sub-sections 52,54 and/or the third rectangular shaped sub-section 58, or may alternatively have substantially equal dimensions to at least one of the aforementioned sub-sections. Dimensions of each of the sub-sections and partitions within the side sill 50 may vary, including wall thickness of any of the sub-sections or perimeter sides.

IV. B-Pillar

Figure 10:
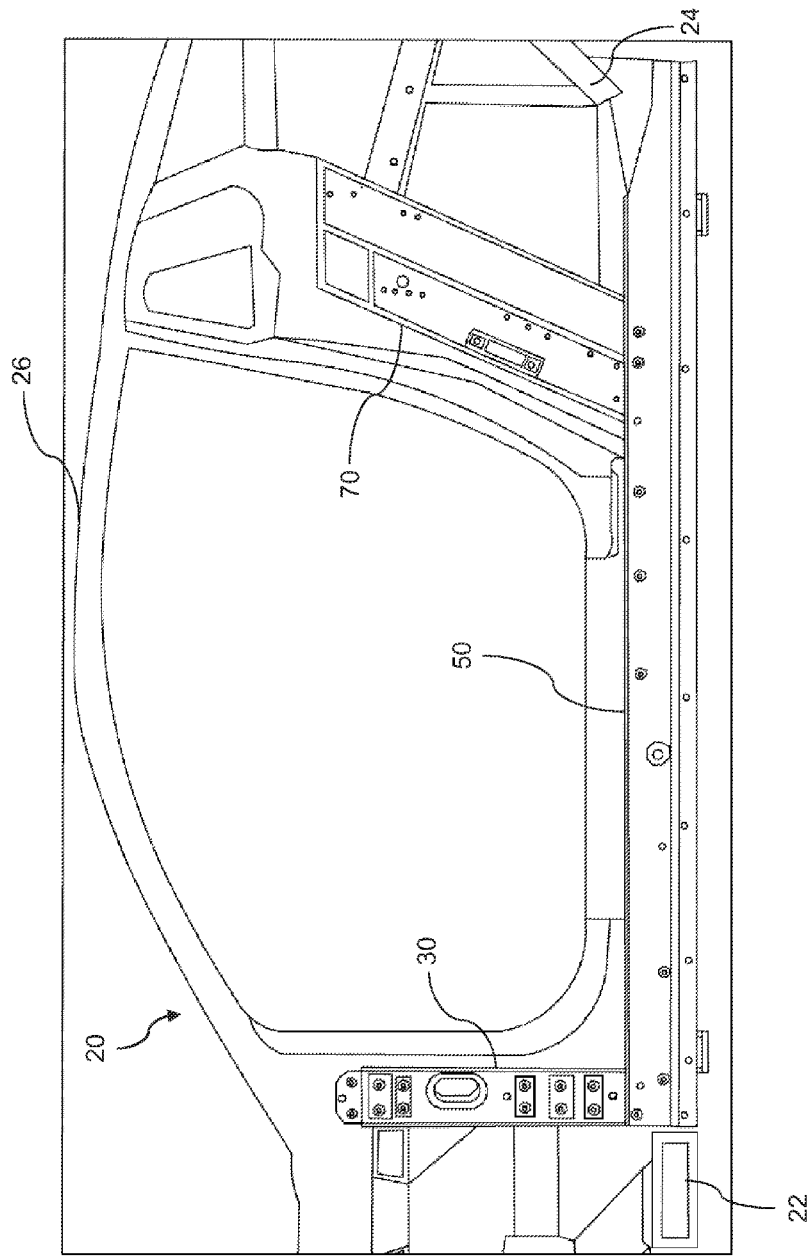
FIG. 10 is a perspective view of the side of the vehicle including an exemplary B-pillar in accordance with the disclosed subject matter.

The present embodiment of the B-pillars 70 shown in FIG. 10 can be disposed proximate the rear sub-assembly 24 of the vehicle frame assembly 20. Specifically, the B-pillars 70 can be disposed adjacent portions of the respective side sills 50 configured at a rear of the respective door openings. Thus, the B-pillars 70 may be disposed aft of the passenger area of the vehicle frame assembly 20. The B-pillars 70 can extend at an angle from the floor of the vehicle frame assembly 20, specifically the side sills 50. However, the B-pillars 70 of other embodiments may be oriented substantially vertically rather than at an angle.

Figure 11:
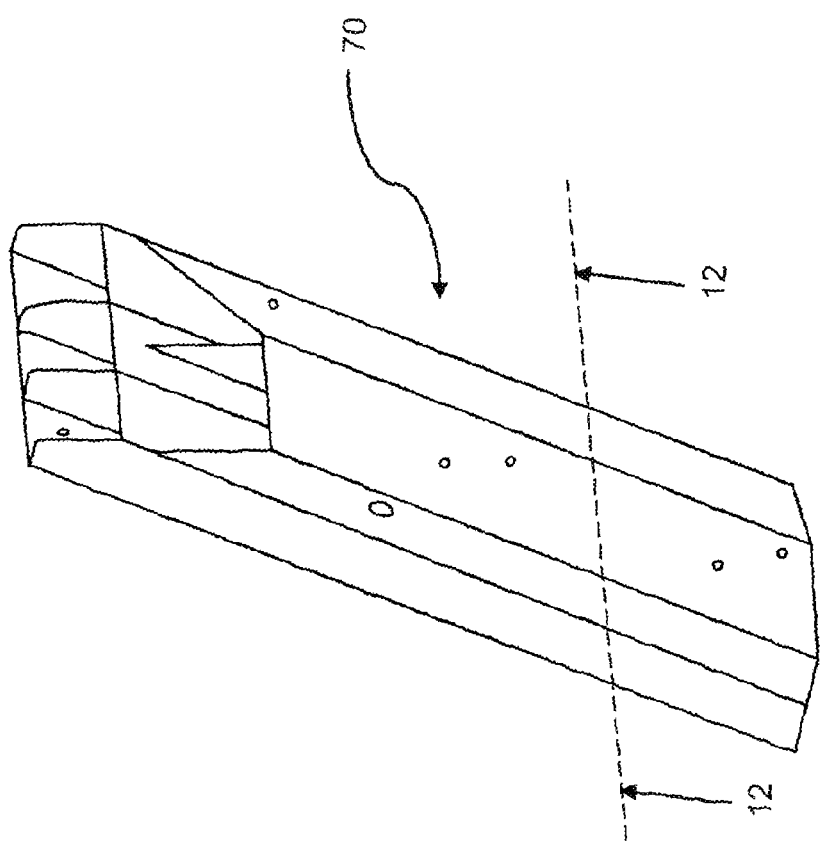
FIG. 11 is a perspective view of the B-pillar.
Figure 12:
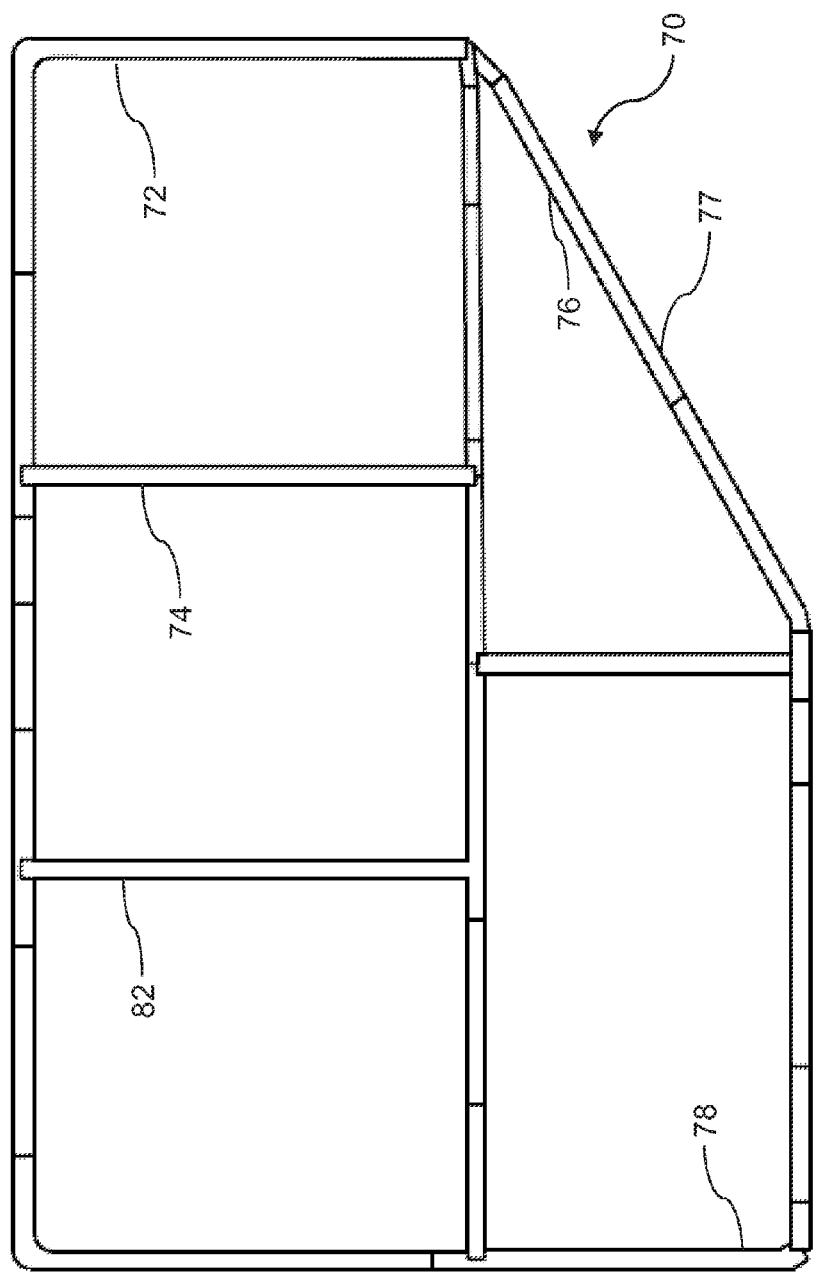
FIG. 12 is a cross-section view of the B-pillar of FIG. 11.

The B-pillars 70 of the present embodiment shown in FIGS. 11-12 can be configured as an extruded element having various shaped sub-sections extending therethrough. The sub-sections can be configured as open-ended channels extending between opposing ends of the B-pillars 70, the sub-sections extending parallel to each other. The B-pillars 70 may include various fasteners and apertures configured to facilitate attachment of the B-pillars 70 to the vehicle frame assembly 20.

As shown in detail in the cross-section view of the B-pillar 70 in FIG. 12, the B-pillar 70 can be configured to include the various shaped sub-sections described above. Specifically, the B-pillars 70 of the present embodiment can be extruded to form shapes defining at least two rectangular shaped sub-sections 72,74 and one non-parallelogram shaped sub-section 76. The non-parallelogram shaped sub-section 76 can include an angled side 77. The two rectangular shaped sub-sections 72,74 may have substantially equal dimensions, or alternatively may have varying dimensions. In the present embodiment, the B-pillar 70 can also form a third rectangular shaped sub-section 78. The third rectangular shaped-subsection 78 may have different dimensions than the two rectangular shaped sub-sections 72,74, or may alternatively have substantially equal dimensions. The B-pillar 70 of the present embodiment may also include a fourth rectangular shaped sub-section 82. The fourth rectangular shaped-subsection 82 may have different dimensions than the two rectangular shaped sub-sections 72,74 and/or the third rectangular shaped sub-section 78, or may alternatively have substantially equal dimensions to at least one of the aforementioned sub-sections. Dimensions of each of the sub-sections and partitions within the B-pillar 70 may vary, including wall thickness of any of the sub-sections or perimeter sides.

V. Rear Cabin Pillar

Figure 13:
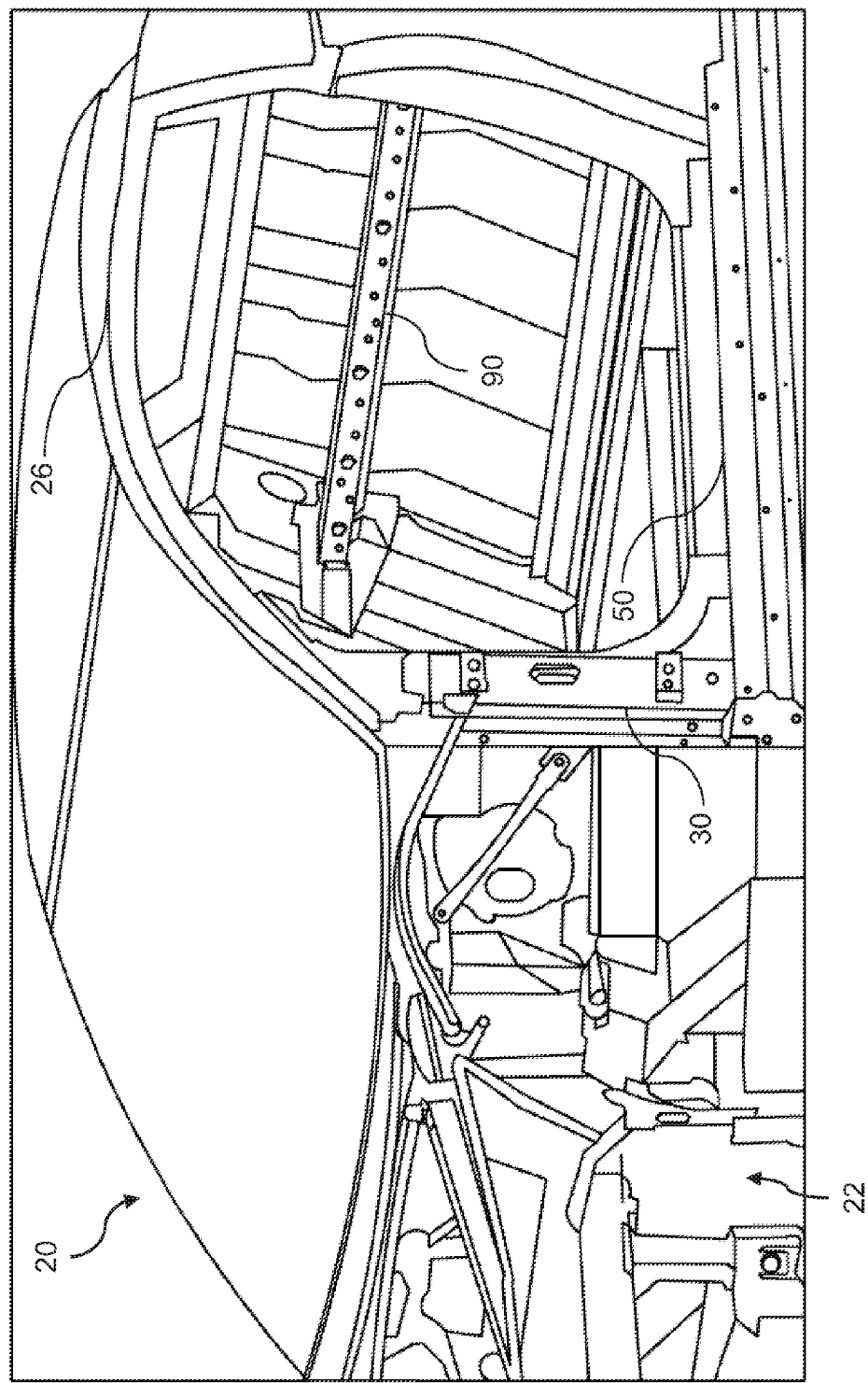
FIG. 13 is a perspective view of part of the vehicle including an exemplary rear cabin pillar in accordance with the disclosed subject matter.

The present embodiment of the rear cabin pillar 90 shown in FIG. 13 can be disposed proximate the front rear-assembly 22 of the vehicle frame assembly 20. Specifically, the rear cabin pillar 90 can be disposed proximate the B-pillars 70 described above. Thus, the rear cabin pillar 90 may be disposed along a rear of the passenger area of the vehicle frame assembly 20. The rear cabin pillar 90 can extend horizontally across the passenger area of the vehicle frame assembly 20, extending between the B-pillars 70. However, the rear cabin pillar 90 of other embodiments may be configured to extend between other elements in the vehicle frame assembly 20.

Figure 14:
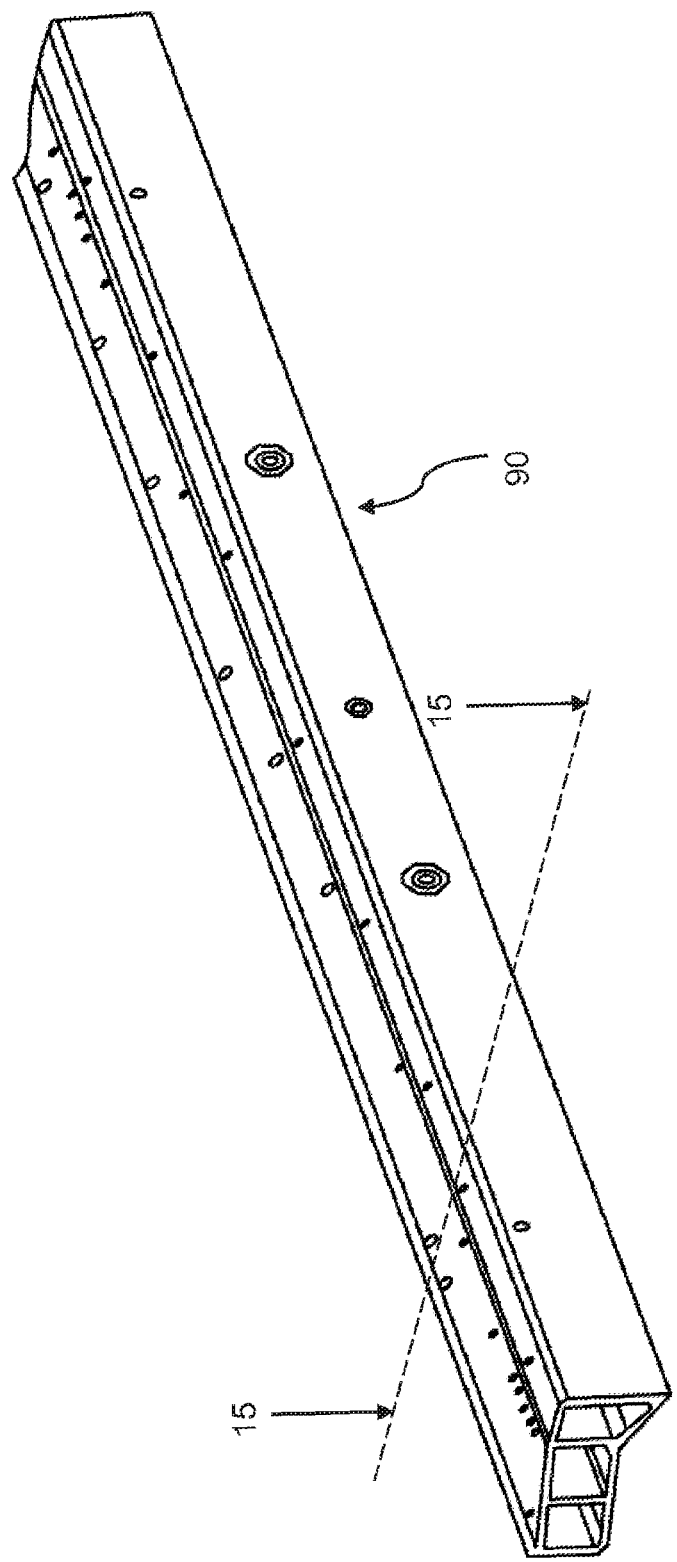
FIG. 14 is a perspective view of the rear cabin pillar.
Figure 15:
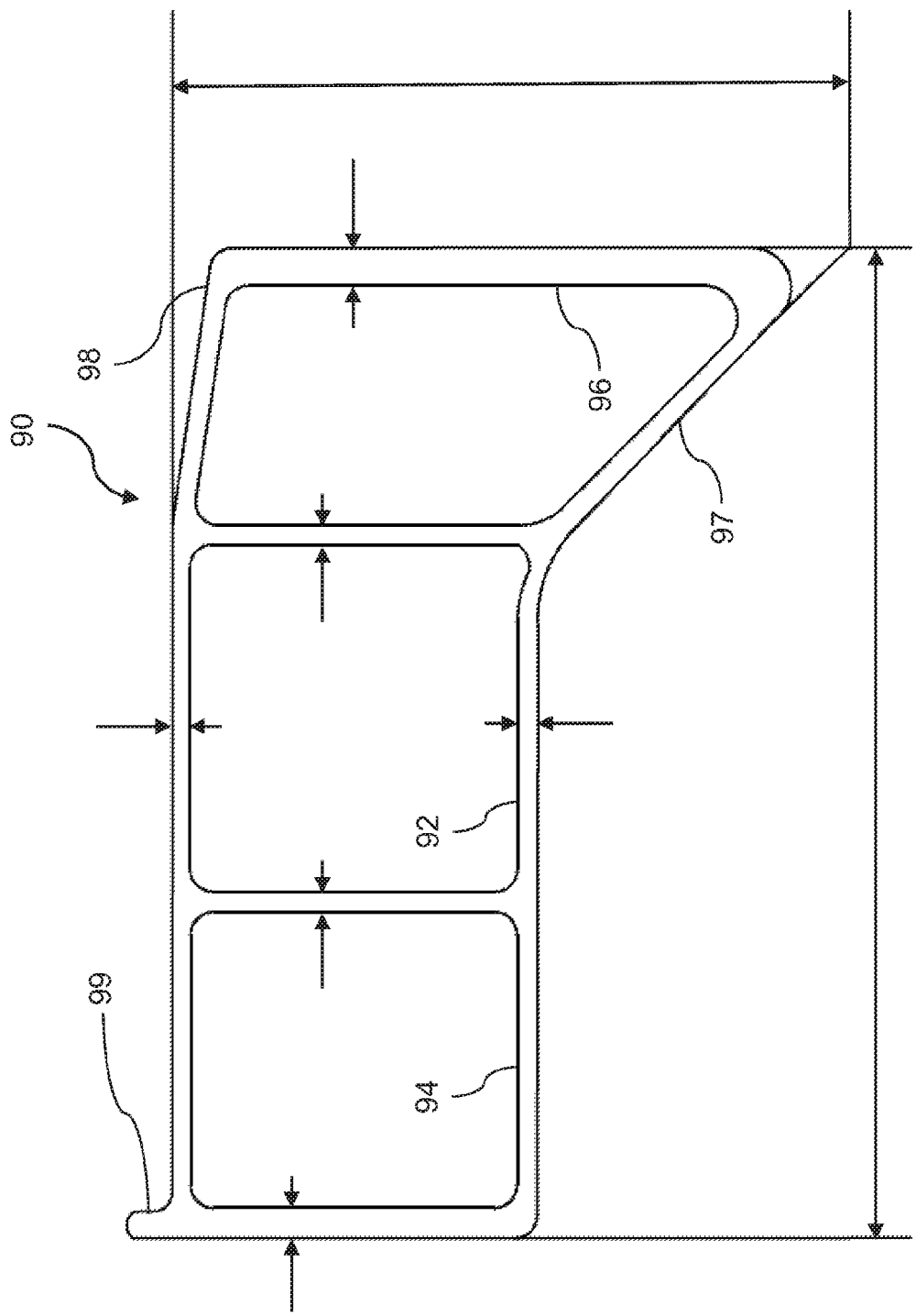
FIG. 15 is a cross-section view of the rear cabin pillar of FIG. 14.

The rear cabin pillar 90 of the present embodiment shown in FIGS. 14-15 can be configured as an extruded element having various shaped sub-sections extending therethrough. The sub-sections can be configured as open-ended channels extending between opposing ends of the rear cabin pillar 90, the sub-sections extending parallel to each other. The rear cabin pillar 90 may include various fasteners and apertures configured to facilitate attachment of the rear cabin pillar 90 to the vehicle frame assembly 20, particularly to the rear of the passenger area.

As shown in detail in the cross-section view of the rear cabin pillar 90 in FIG. 15, the rear cabin pillar 90 can be configured to include the various shaped sub-sections described above. Specifically, the rear cabin pillar 90 of the present embodiment can be extruded to form shapes defining at least two rectangular shaped sub-sections 92,94 and one non-parallelogram shaped sub-section 96. The non-parallelogram shaped sub-section 96 can include a first angled side 97 and a second angled side 98. In the present embodiment, the first angled side 97 may extend at a different angle than the second angled side 98. Furthermore, the first angled side 97 may extend at a more severe angle than that of the second angled side 98. The two rectangular shaped sub-sections 92,94 may have substantially equal dimensions, or alternatively may have varying dimensions. In the present embodiment, the rear cabin pillar 90 can also include a protruding section 99 extending from the rectangular shaped sub-section 94. Dimensions of each of the sub-sections and partitions within the A-pillar 30 may vary, including wall thickness of any of the sub-sections or perimeter sides.

VI. Alternative Embodiments

While certain embodiments of the invention are described above, and FIGS. 1-15 disclose the best mode for practicing the various inventive aspects, it should be understood that the invention can be embodied and configured in many different ways without departing from the spirit and scope of the invention.

For example, embodiments are disclosed above in the context of extruded support members shown in FIGS. 1-15. However, embodiments are intended to include or otherwise cover any type of support member having a particular cross-section enhancing structural performance for facilitating enhanced operation of the vehicle, as disclosed above.

For example, exemplary embodiments are intended to include support members having sub-sections extending therein for providing structural reinforcement to enhance characteristics such as stiffness and rigidity without impeding vehicle performance from unnecessary added mass. The exemplary embodiments of the various support members include at least two sub-sections approximately rectangular in cross-section extending through each support member, as well as one sub-sections having a non-parallelogram cross-section extending therethrough. Some embodiments of the support, however, may include more than two sub-sections approximately rectangular in cross-section, such as three, four, five, etc. Furthermore, the rectangular sub-sections may be oriented in any appropriate manner, such as being arranged in series consecutively, or in block formation joined both above/below and to the side to other sub-sections.

Other embodiments may be configured to include one or more protruding sections configured as a wall extending from one of the sub-sections. The protruding section may extend orthogonally from the sub-section to which it is connected, or may alternatively extend at an angle therefrom. A length of the protruding section may also be varied.

As described above, dimensional thickness of the walls of the various sub-sections within each of the support members may be varied. In some embodiments, each of the walls may have a substantially similar thickness, while other embodiments may include no walls having equal thickness. Also, some embodiments may include some walls with substantially similar thickness, while other walls have differing thicknesses.

All or some of the alternative structures disclosed above with regard to the support members also apply to non-vehicular applications. The above alternative configurations of the support members are merely provided for exemplary purposes, and as indicated above, embodiments are intended to cover any type of support member having the cross-sectional shapes as disclosed above. Embodiments are also intended to include or otherwise cover any alternative or additional support members other than the A-pillars, side sills, B-pillars, and rear cabin pillar described above that are structured and disposed to perform as disclosed above with regard to a frame assembly.

As disclosed above, embodiments are intended to be used with vehicle frame assemblies for any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the support members disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A support structure for use with a vehicle, the vehicle having a frame to which the support structure is attached, the support structure comprising:
   an elongated pillar defining a hollow portion extending therethrough, the elongated pillar also defining:
   at least two rectangular channels approximately rectangular in cross-section extending through the hollow portion along a direction of elongation of the pillar; and
   one other channel having a non-parallelogram cross-section extending through the hollow portion along a direction of elongation of the pillar.

2. The support structure according to claim 1, wherein one of the at least two rectangular channels is formed adjacent the one other channel so as to share a portion of a common wall.

3. The support structure according to claim 1, wherein the one other channel includes an angled side extending between substantially parallel sides.

4. The support structure according to claim 1, wherein the at least two rectangular channels have substantially equal cross-sectional dimensions.

5. The support structure according to claim 1, wherein the elongated pillar includes three rectangular channels approximately rectangular in cross-section extending through the hollow portion along a direction of elongation of the pillar.

6. The support structure according to claim 5, wherein at least two of the rectangular channels are formed adjacent the one channel having a non-parallelogram cross-section so as to each share a portion of a common wall.

7. The support structure according to claim 1, wherein the elongated pillar includes four rectangular channels approximately rectangular in cross-section extending through the hollow portion along a direction of elongation of the pillar.

8. The support structure according to claim 1, wherein the one other channel is approximately triangular in cross-section.

9. The support structure according to claim 1, wherein the elongated pillar includes at least one projecting wall extending outward from one of the at least two rectangular channels.

10. The support structure according to claim 1, wherein the elongated pillar is configured as at least one of an A-pillar, a side sill, a B-pillar, and a rear cabin pillar.

11. A frame assembly for use with a vehicle, the frame assembly comprising:
    a frame body; and
    a support structure configured for attachment to the frame, the support structure including:
    an elongated pillar defining a hollow portion extending therethrough, the elongated pillar also defining:
    at least two rectangular channels approximately rectangular in cross-section extending through the hollow portion along a direction of elongation of the pillar; and
    one other channel having a non-parallelogram cross-section extending through the hollow portion along a direction of elongation of the pillar.

12. The frame assembly according to claim 11, wherein one of the at least two rectangular channels is formed adjacent the one other channel so as to share a portion of a common wall.

13. The frame assembly according to claim 11, wherein the one other channel includes an angled side extending between substantially parallel sides.

14. The frame assembly according to claim 11, wherein the at least two rectangular channels have substantially equal cross-sectional dimensions.

15. The frame assembly according to claim 11, wherein the elongated pillar includes three rectangular channels extending through the hollow portion along a direction of elongation of the pillar.

16. The frame assembly according to claim 15, wherein at least two of the rectangular channels are formed adjacent the one channel having a non-parallelogram cross-section so as to each share a portion of a common wall.

17. The frame assembly according to claim 11, wherein the elongated pillar includes four rectangular channels approximately rectangular in cross-section extending through the hollow portion along a direction of elongation of the pillar.

18. The frame assembly according to claim 11, wherein the one other channel is approximately triangular in cross-section.

19. The frame assembly according to claim 11, wherein the elongated pillar includes at least one projecting wall extending outward from one of the at least two rectangular channels approximately rectangular in cross-section.

20. A method of manufacturing a support structure for use with a vehicle, the vehicle having a frame to which the support structure is configured to be attached to, the method comprising:

- extruding an elongated pillar defining a hollow portion extending therethrough;
- forming at least two rectangular channels approximately rectangular in cross-section extending through the hollow portion along a direction of elongation of the pillar; and
- forming one other channel having a non-parallelogram cross-section so as to extend through the hollow portion along a direction of elongation of the pillar.

* * * * *